United States Patent [19]
Lane et al.

[11] Patent Number: 5,873,549
[45] Date of Patent: Feb. 23, 1999

[54] VEHICLE ROTATION AND CONTROL MECHANISM

[75] Inventors: Jeffery G. Lane, Irvine; James R. French, Los Angeles, both of Calif.

[73] Assignee: McDonnell Douglas Corporation, Huntington Beach, Calif.

[21] Appl. No.: 719,457

[22] Filed: Sep. 25, 1996

[51] Int. Cl.$^6$ .......................... F42B 10/14; F42B 10/50; F42B 15/01; B64G 1/62

[52] U.S. Cl. ................. 244/160; 244/138 A; 244/139; 244/63; 244/3.28; 102/384; 102/388

[58] Field of Search ................. 244/3.28, 3.29, 244/138 A, 138 R, 139, 160, 164, 63; 102/384, 385, 388

[56] References Cited

U.S. PATENT DOCUMENTS

| | | | |
|---|---|---|---|
| 1,324,433 | 12/1919 | Phillips, Jr. | 102/384 |
| 2,840,328 | 6/1958 | Richardson et al. | 244/113 |
| 3,065,937 | 11/1962 | Vigil . | |
| 3,098,445 | 7/1963 | Jackson | 244/138 A |
| 3,118,636 | 1/1964 | Kantrowitz et al. . | |
| 3,181,824 | 5/1965 | Anania | 244/160 |
| 3,210,025 | 10/1965 | Lubben et al. . | |
| 3,246,864 | 4/1966 | Mack et al. | 244/138 A |
| 3,776,490 | 12/1973 | Weis | 244/3.27 |
| 3,903,801 | 9/1975 | Senoski . | |
| 4,007,505 | 2/1977 | Nowatzki | 244/3.28 |
| 4,832,288 | 5/1989 | Kendall et al. . | |
| 4,896,847 | 1/1990 | Gertsch . | |
| 5,031,857 | 7/1991 | Macconochie et al. | 244/3.28 |
| 5,322,248 | 6/1994 | Ragab . | |
| 5,398,888 | 3/1995 | Gerhardt | 244/3.27 |

*Primary Examiner*—V. Lissi Mojica
*Attorney, Agent, or Firm*—Harness Dickey & Pierce P.L.C.

[57] ABSTRACT

A nose assembly and method for controlling the rotation and stabilizing the orientation of a vehicle during landing maneuvers. The vehicle includes a nose assembly that is coupled to an airframe thereof and that has a frame and flap assembly. The flap assembly includes an actuating means and a flap coupled to the frame such that the actuating means moves the flap from and between a fully retracted position and a fully extended position in response to a guidance signal received from a flight control computer. In a preferred embodiment of the present invention, the flap assembly includes a plurality of flaps each coupled to the nose assembly frame and an actuating means that selectively positions the plurality of flaps in response to a signal. The method for rotating a vehicle from a nose-forward orientation to a base-forward orientation includes the steps of orientating the vehicle in nose-forward flight, rotating the vehicle in a first direction, and selectively actuating one of a first and second flap from a retracted position toward an extended position to generate a damping moment tending to position the vehicle in a base-forward orientation.

20 Claims, 3 Drawing Sheets

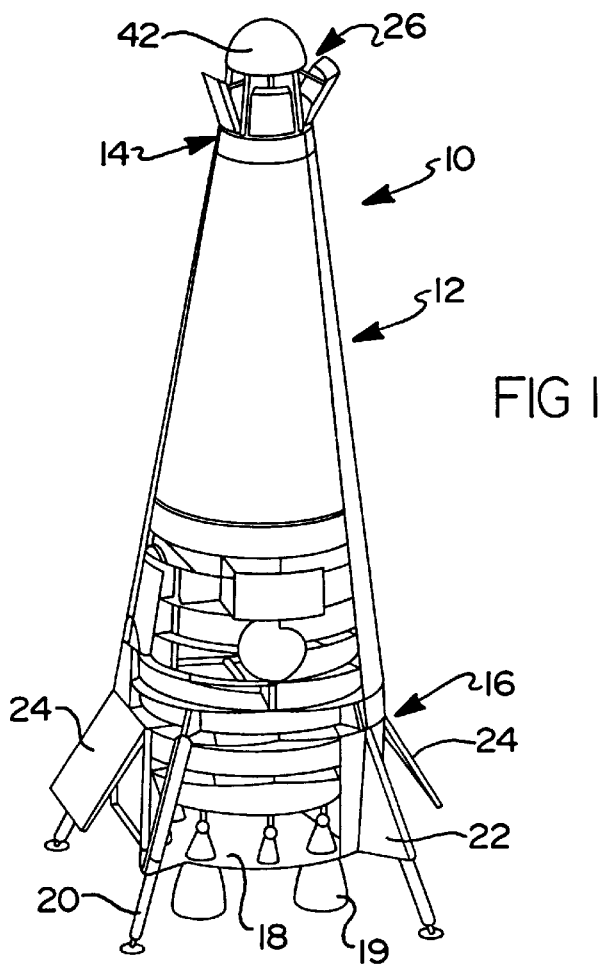
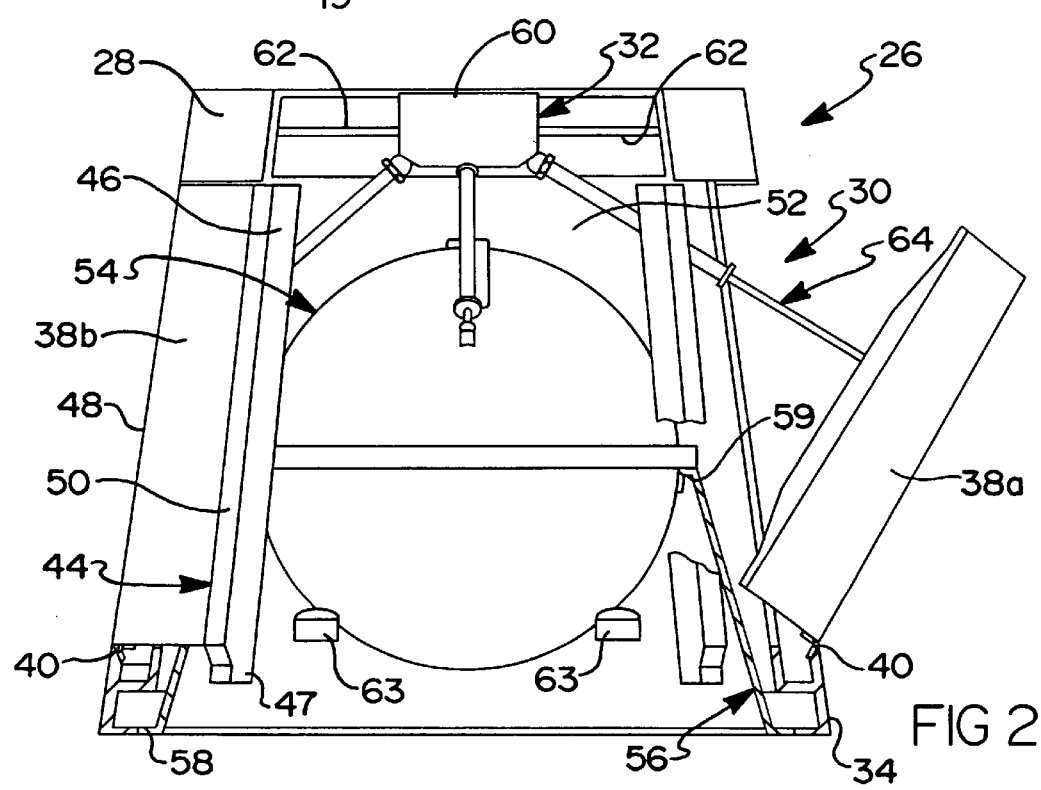

VEHICLE ROTATION AND CONTROL MECHANISM

BACKGROUND OF THE INVENTION

1. Technical Field

The present invention relates generally to a direction control assembly for an aerospace vehicle and, more particularly, to a flap assembly at the forebody of a reusable launch vehicle for rotating and stabilizing the vehicle during entry and pre-landing maneuvers.

2. Discussion

Reusable launch vehicles used to deploy satellites in a predetermined orbit about the earth include single stage to orbit ("SSTO") vehicles that are designed to perform their intended operation and return to earth without jettisoning any portions of the vehicle. Accordingly, SSTO vehicles do not include discardable booster rockets or fuel tanks. Rather, the fuel supply elements of SSTO vehicles are retained throughout the flight thereby increasing the need to minimize fuel consumption in order to decrease the unusable weight carried into orbit. The present invention addresses these concerns by providing a vehicle rotation and control mechanism that reduces propellant acquisition subsystems and the propellant required to properly position the vehicle for landing.

Vertically landing SSTO vehicles commonly include a conically shaped airframe configured for stable flight in a nose-forward orientation. However, since the vehicle is vertically landed in a rearward or tail-first orientation a rotation of the vehicle during the landing sequence is required. Currently, SSTO vehicles of this class perform the rotation maneuver through the use of engine power. More specifically, the maneuver includes starting several of the main engines, retracting entry flaps so that the vehicle pitches up to initiate rotation, and selectively throttling up the engines to arrest rotation and place the vehicle into the desired base-first orientation. In order to minimize the quantity of propellant consumed by the engines between the rotation and touch down phases of the landing procedure, this rotation maneuver is generally conducted at a relatively low altitude. While this procedure is viable, a considerable amount of propellant is used during the starting and operation of the engines and the propellant feed system becomes heavy and complex. Further, the relatively low altitude compresses landing functions into a shorter timeline.

SUMMARY OF THE INVENTION

The present invention provides a nose assembly and method for controlling the rotation and stabilizing the orientation of an aerospace vehicle during landing maneuvers. The vehicle includes a nose assembly that is coupled to an airframe and that has a frame and flap assembly. The flap assembly includes an actuating means and a flap coupled to the frame such that the actuating means moves the flap from and between a fully retracted position and a fully extended position in response to a guidance signal received from the flight control computer. In a preferred embodiment of the present invention, the flap assembly includes four of flaps each coupled to the nose assembly frame and an actuating means that selectively positions each flap in response to a signal. A method for rotating the vehicle from a nose-forward orientation to a base-forward orientation according to the present invention includes the steps of orientating the vehicle in nose-forward flight, rotating the vehicle in a first direction, and selectively actuating one of a first and second flap to an extended position to generate a damping moment tending to position the vehicle in a base-forward orientation.

BRIEF DESCRIPTION OF THE DRAWINGS

Other objects and advantages of the invention will become apparent upon reading the following detailed description and upon reference to the drawings, in which:

FIG. 1 is a perspective view of a reusable launch vehicle in accordance with the present invention;

FIG. 2 is a front partial sectional view of the nose cone of the vehicle shown in FIG. 1 with a flap removed for clarity;

DETAILED DESCRIPTION

Figure 3:
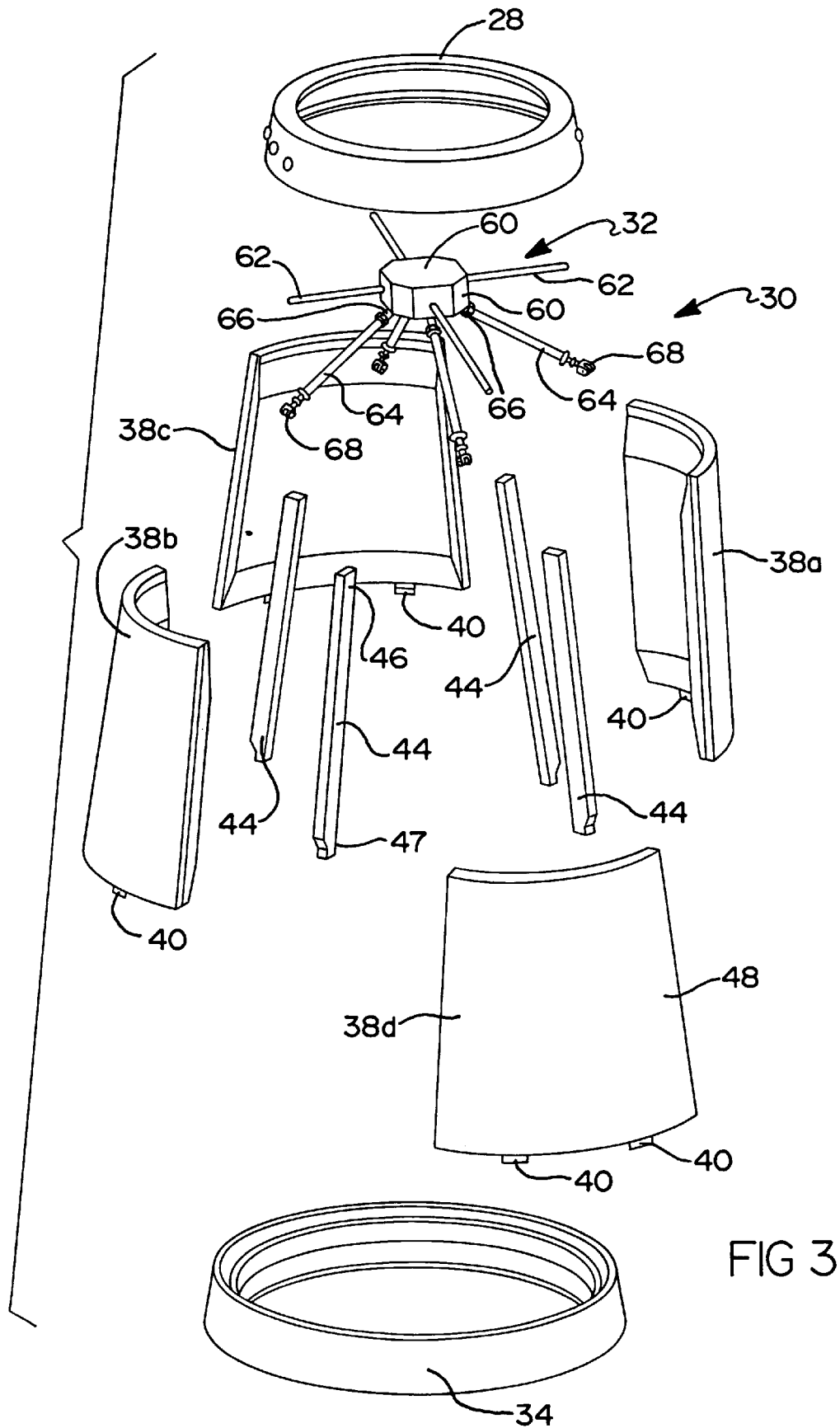
FIG. 3 is an exploded perspective view of the nose cone shown in FIG. 2.

The following description of the preferred embodiment of the present invention is merely exemplary in nature and is in not intended to limit the scope of the claimed invention. Moreover, while depicting the invention in a single stage to orbit ("SSTO") vehicle, the description is intended to adequately teach one skilled in the art to make and use the vehicle rotation and control mechanism and method described and claimed herein in a variety of aerospace vehicles.

As illustrated in FIG. 1 of the drawings, a vertically landing reusable launch vehicle 10 includes a generally conical shaped airframe 12 defining a forebody 14 and a thrust structure 16. Thrust structure 16 includes a base 18 proximate to which landing gear 20, fins 22, and rear flaps 24 are coupled to airframe 12. The forward portion of rear flaps 24 are pivotably connected to airframe 12 in a manner known in the art and an actuating mechanism (not shown) communicates with a flight control computer (not shown) and is coupled to rear flaps 24 to control the angular position thereof relative to airframe 12. During normal, nose-first flight, the flight computer selectively positions rear flaps 24 to stabilize the flight path and orientation of vehicle 10.

Forebody 14 of airframe 12 includes a nose cone 26 that is shown in FIGS. 2 and 3 to include a flap assembly 30 having a flap actuating apparatus 32 connected to an upper bulkhead ring 28. Nose cone 26 further includes a lower bulkhead ring 34, a plurality of flaps 38a, 38b, 38c, and 38d pivotably connected to lower ring 34 via hinge assemblies 40, a cap 42 (FIG. 1) securable to upper ring 28 in a manner known in the art, and stringers 44 having a first end 46 connected to upper bulkhead 28 and a second end 47 configured to cooperate with lower bulkhead 34. Assembly 30 preferably includes four (4) circumferentially opposed and separately operable flaps that form flap pairs capable of providing opposing damping moments during vehicle flight. As best seen in FIG. 2, flaps 38a and 38b illustrate one of the pair of opposed flaps wherein flap 38a is shown in a fully extended or fully pivoted position whereas flap 38b is fully retracted. In a manner known in the art, actuating apparatus 32 selectively positions flaps 38a and 38b at or between the fully extended and fully retracted positions in response to an input signal received from the vehicle's flight computer (not shown).

When constructed as described herein and as best seen in FIG. 2, cap 42, upper ring 28, an outer surface 48 of flaps 38, and a radially outer surface 50 of stringers 44 cooperate to define a relatively smooth and aerodynamic outer surface surrounding a cavity 52. In the preferred embodiment, cavity 52 houses an auxiliary liquid oxygen tank 54 and actuating apparatus 32. More particularly, a conical support 56 is shown to include a lower flange 58 fastened to lower bulkhead ring 34 and an upper flange 59 connected to support auxiliary tank 54. Tabs 63 are connected to conical support 56 to provide additional support for tank 54. However, those skilled in the art will appreciate that a variety of alternative locations are available within vehicle 10 for both tank 54 and actuating apparatus 32. As is common in the art, each of the structural members of nose cone 26, i.e. upper bulkhead ring 28, lower bulkhead ring 34, cap 42, stringers 44, and conical support 56, are composed of a high strength and low weight composite such as a graphite epoxy. Likewise, those skilled in the art will appreciate that the portions of each member exposed to the atmosphere during reentry is provided with a heat resistant material such as alumina enhanced thermal barrier (AETB) tiles.

With reference to FIGS. 2 and 3, actuating apparatus 32 of flap assembly 30 preferably includes an actuator housing 60 coupled to nose cone 26 such as by a plurality of radially extending mounting arms 62 interconnecting actuator housing 60 and upper ring 28. Actuator housing 60 is coupled for communication with the flight control computer in a manner known in the art and is operationally connected to flaps 38a, 38b, 38c, and 38d via telescoping arms 64 having a first end 66 coupled to actuator housing 60 and a distal end 68 coupled to flap 38. Actuating apparatus 32 may include a variety of hydraulic or electromechanical actuators known in the art such as, for example, hydraulic actuator part number ARG 7376-5007 manufactured by B.F. Goodrich of Cleveland, Ohio or the hydraulic or electromechanical actuators commercially available from Allied-Signal of Torrance, Calif. However, various equivalent actuating assemblies are readily available and adaptable for use with the present invention.

Launch vehicle 10 normally operates in a nose-forward orientation. However, in preparation for landing, it is necessary to reorient vehicle 10 into a rearward or base-first orientation such that landing gear 20 is positioned to contact the landing surface. The present invention performs the rotation and descent sequence with limited propellant consumption and at a relatively high altitude in comparison to current SSTO vehicle systems of this type. Specifically, flap assembly 30 of the present invention allows the flight control system to selectively position the flaps 38a, 38b, 38c, and 38d to stabilize reusable launch vehicle 10 during rearward flight as well as to modulate the flap positions to perform the rotation maneuver required to land vehicle 10.

Figure 4:
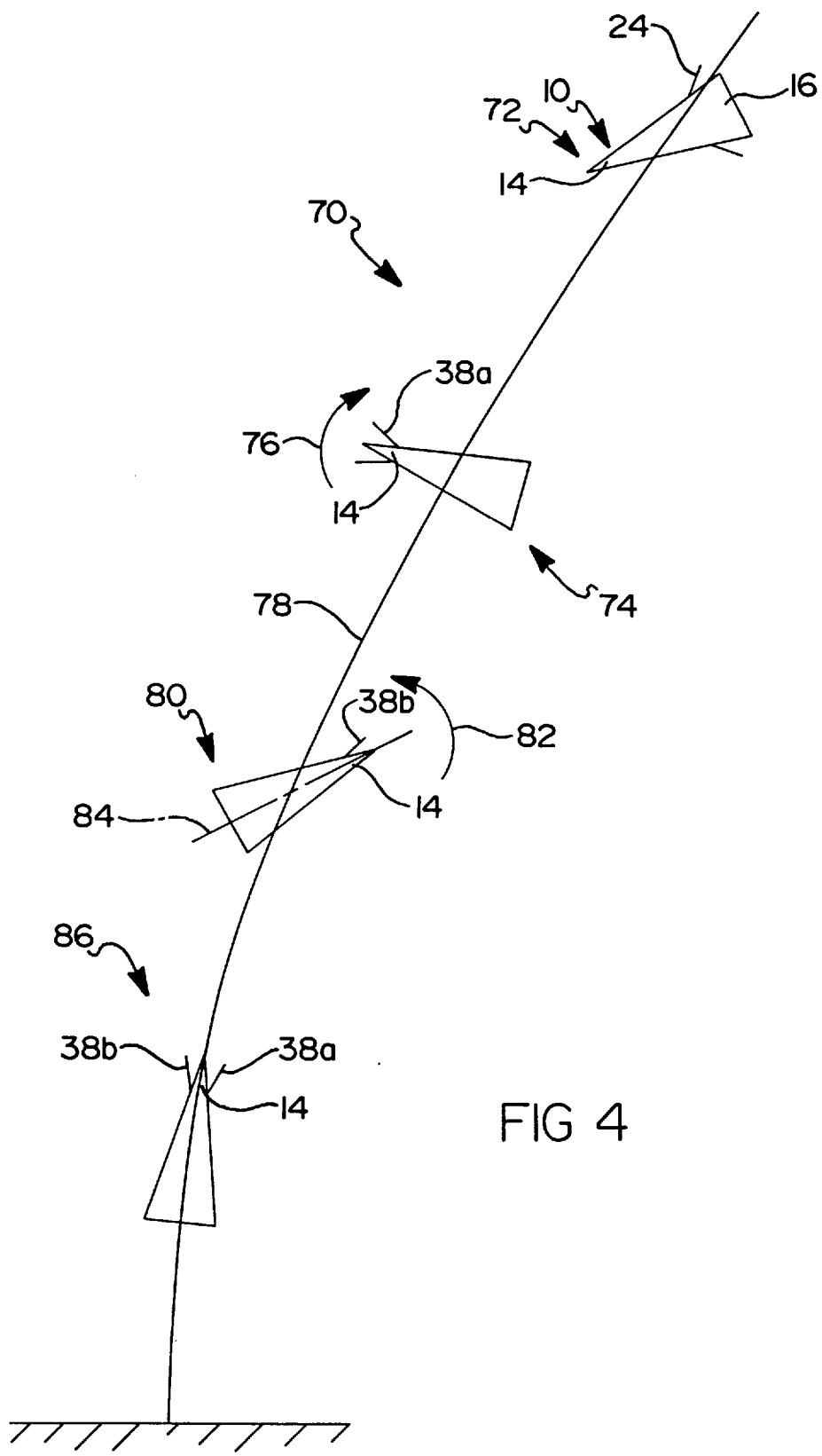
FIG. 4 is a schematic illustrating the orientation and nose flap position during the landing rotation sequence of the single stage to orbit vehicle shown in FIG. 1.

Selective actuation of flaps 38 by actuating apparatus 32 provides for the rotation of vehicle 10 according to a specific sequence such as landing sequence 70 shown in FIG. 4 and described herein. Prior to initiation of landing sequence 70, rear flaps 24 are in a partially or fully extended position in order to stabilize the flight path and orientation of reusable launch vehicle 10 as shown at reentry stage 72. In order to minimize propellant consumption, vehicle engines 19 are maintained in an off state during the initiation of landing sequence 70 allowing vehicle 10 to travel along a generally parabolic flight path 78. While the initial stabilization of vehicle 10 is described at reentry stage 72 as being provided by rear flaps 24, those skilled in the art will appreciate that other stabilization techniques and structures may be used without departing from the proper scope of the appended claims.

Landing sequence 70 is initiated by retracting rear flaps 24 thereby initiating pitch up of vehicle 10 as shown at pitch up stage 74. The flight control computer of vehicle 10 is programmed to deflect leeward nose flap 38a at an angle sufficient to provide a predetermined damping moment that slows the clockwise rotation of vehicle 10 indicated by arrow 76.

In the preferred rotation sequence illustrated in FIG. 4, the rotation occurring at pitch up stage 74 causes clockwise rotation of vehicle 10 beyond the rearward flight orientation before the damping effects of extended flap 38a eliminates rotation. Accordingly, flap 38a is maintained in an extended position until, as indicated in overshoot stage 80, a predetermined counterclockwise rotational velocity is attained whereupon the flight control computer signals actuating apparatus 32 to pivot flap 38b into a predetermined extended position. In this position, flap 38b dampens the counterclockwise rotation of vehicle 10 indicated by arrow 82. The flight control computer is programmed to maintain flap 38b in an extended position as heretofore described to dampen rotation of vehicle 10 until the longitudinal axis 84 of vehicle 10 is substantially aligned with flight path 78 and the vehicle is in rearward flight. The flight control computer then signals the actuating apparatus to extend both flaps 38a and 38b so as to stabilize the flight path as shown at descent stage 86 of landing sequence 70.

Those skilled in the art will appreciate that while the preceding description of landing sequence 70 refers only to flaps 38a and 38b, an additional pair of flaps 38c and 38d (FIG. 1) are provided on nose cone 26 so that flap assembly 30 provides adequate control regardless of the angular position of vehicle 10 relative to longitudinal axis 84 and flight path 78. More particularly, it is anticipated that vehicle 10 may at times rotate about its axis 84 during landing sequence 70 in response to which the flight control computer actuates a reaction control system (not shown) to perform landing sequence 70.

Finally, the flight control computer is configured to adjust the respective positions of flaps 38a, 38b, 38c, and 38d during descent stage 86 so as to stabilize the rearward flight of the vehicle for landing. More particularly, the flight control computer is preferably configured to maintain the minimum angles of flap deflection necessary to provide a pitching moment sufficient to stabilize the vehicle during flight and to differentially modulate the flap deflection angles to create the required damping moments heretofore described. The modulation of the flap deflection angles during descent stage 86 provide pitch and yaw control in rearward flight to steer out flight dispersions caused by guidance and navigation errors and winds. Accordingly, the present invention provides a differential flap modulation apparatus in the nose of reusable launch vehicle 10 that controls the rotation and stabilizes the flight path of the vehicle during rotation and landing. Those skilled in the art will appreciate that the flight control computer also controls the operation of vehicle engines 19 so as to regulate the descent and touchdown velocities of vehicle 10.

As described, the present invention controls the position and orientation of vehicle 10 during rotation and landing sequence 70 without requiring the consumption of propellant. Accordingly, the rotation sequence may occur at a relatively high altitude while minimizing any dry weight additions to the vehicle due to propellant acquisition requirements in a nose-forward orientation. By decreasing the unusable weight carried into orbit, the payload capacity of reusable launch vehicle 10 is increased.

Various other advantages of the present invention will become apparent to those skilled in the art after having the benefit of studying the foregoing text and drawings taken in conjunction with the following claims:

What is claimed is:

1. A vehicle adapted to be launched into orbit about the earth and to return to the earth without jettisoning any portions of the vehicle, said vehicle comprising:
   an airframe; and
   a nose assembly coupled to said airframe, said nose assembly including a frame and a flap assembly having a plurality of independent flaps coupled to said frame for independent movement from and between fully retracted positions and fully extended positions, said flap assembly further including an actuating assembly for moving said flaps from and between said fully retracted positions and said fully extended positions; and
   a flight control computer carried by said vehicle for generating guidance signals to control actuation of said flaps in a manner to cause said vehicle to controllably rotate from a nose down orientation during descent to a nose up orientation prior to landing, and to stabilize said vehicle in said nose up orientation as said vehicle approaches the earth.

2. The vehicle of claim 1 wherein said actuating assembly includes an actuating member coupled to one of said flaps and an actuator for moving said actuating member in response to said guidance signals.

3. The vehicle of claim 2 wherein said actuating member has a first end coupled to said one flap and a second end coupled to said actuator.

4. The vehicle of claim 3 wherein said actuating member is a telescoping arm including a first member and a second member, said first member having a first end coupled to said actuator, said one second member having a first end coupled to said first member for movement relative thereto and a second end coupled to said one flap.

5. The vehicle of claim 1 wherein said one flap includes a first end pivotably coupled to said frame and a second end movable from and between said fully retracted position and said fully extended position.

6. The vehicle of claim 1 wherein said flaps are circumferentially disposed about said nose assembly, each of said flaps being coupled to said actuating means and said frame for movement independently from and between fully retracted and fully extended positions.

7. A nose assembly for use in a single-stage-to-orbit (SSTO) vehicle of the type having an airframe defining a base and a forebody, a propulsion system connected to the base, and a flight control system for generating flap positioning signals, said nose assembly comprising:
   a frame connectable to the forebody of the airframe;
   a flap assembly including a plurality of independent flaps coupled to said frame for independent movement between retracted positions and extended positions;
   and an actuating assembly coupled to said plurality of flaps for selectively independently positioning each one of said plurality of flaps in response to said flap positioning signals to controllably re-orient said vehicle from a nose-down position as said vehicle approaches earth during descent to a nose up orientation prior to landing.

8. The vehicle of claim 7 wherein said frame includes a bulkhead, and wherein each of said plurality of flaps are pivotably coupled to said bulkhead.

9. The vehicle of claim 7 wherein said frame includes an upper bulkhead, a lower bulkhead, and a plurality of support members coupled to said upper and lower bulkheads.

10. The vehicle of claim 9 wherein said nose assembly further includes a cap coupled to said upper bulkhead and wherein said upper bulkhead, lower bulkhead, plurality of support members, and plurality of flaps each include an outer surface cooperating to define an outer surface of said nose assembly when said flaps are in said retracted positions.

11. The vehicle of claim 7 wherein said actuating means assembly includes a hub and a plurality of actuating members, said hub coupled to said frame and each of said plurality of actuating members coupled to said hub and one of said plurality of flaps.

12. The vehicle of claim 11 wherein each of said plurality of actuating members comprises a telescoping arm including a first member and a second member, said second member being coupled to said first member for telescopic movement relative thereto, said first member being coupled to one of said hub and one of said plurality of flaps and a second member being coupled to the other of said hub and said one of said plurality of flaps.

13. A method for rotating a vehicle adapted to be launched into orbit and to return to earth for landing, from a nose-forward orientation during its flight towards earth to a base-forward orientation prior to landing, the vehicle including a forebody, a base, a propulsion mechanism coupled to the base, a nose-forward flight stabilization assembly, and a flap assembly coupled to said forebody, said flap assembly including a plurality of flaps and an actuating assembly for selectively actuating said flaps between a fully extended position and a fully retracted position, said method comprising the steps of:
   (a) orientating the vehicle in nose-forward flight during its descent toward the earth;
   (b) controlling at least one of said flaps to cause said vehicle to begin rotating in a first direction as said vehicle approaches the earth; and
   (c) selectively extending and retracting various ones of said flaps to generate a damping moment tending to assist positioning and stabilizing the vehicle in a base-forward orientation as said vehicle continues its descent to the earth.

14. The method of claim 13 wherein step (a) includes activating the nose-forward flight stabilization assembly.

15. The method of claim 14 wherein step (b) includes deactivating the nose-forward flight stabilization assembly.

16. The method of claim 13 wherein step (b) includes placing the propulsion mechanism in an off state.

17. The method of claim 13 wherein the vehicle defines a leading surface and a trailing surface when the vehicle rotates in said first direction, wherein a first one of said flaps is coupled to the leading surface of the vehicle and a second one of said flaps is coupled to the trailing surface of the vehicle, and wherein step (c) includes placing said first one of said flaps in an extended position, thereby generating a damping force acting to counter the rotational movement of the vehicle in said first direction.

18. The method of claim 13 further including the step of using said flaps to stabilize the vehicle in a base-forward orientation.

19. The method of claim 18 wherein the step of stabilizing the vehicle in the base-forward orientation includes selectively placing certain ones of the flaps in an extended position.

20. A single stage to orbit (SSTO) vehicle having a nose and a base, said vehicle comprising:

a nose assembly;

said nose assembly including a plurality of independent flaps each moveable between extended and retracted positions independently of one another;

an actuating assembly operatively associated with said flaps for moving said flaps independently of one another between said extended and retracted positions; and a guidance system carried by said vehicle for controlling said actuating assembly such that said flaps are controlled to permit a nose forward flight of said vehicle during a first phase of descent toward the earth, to cause said vehicle to rotate from said nose forward orientation toward a base forward orientation, and during a second phase of said descent to dampen rotation of said vehicle and stabilize said vehicle in a base forward orientation prior to landing.

* * * * *